(12) United States Patent
Ash, Jr. et al.

(10) Patent No.: US 9,124,679 B2
(45) Date of Patent: Sep. 1, 2015

(54) SLEEVE WITH ELECTRONIC EXTENSIONS FOR A CELL PHONE

(71) Applicant: MoJoose, Inc., Laguna Niguel, CA (US)

(72) Inventors: Daniel R. Ash, Jr., Laguna Niguel, CA (US); Daniel R. Ash, Sr., Sacramento, CA (US); Joseph Storniolo, Long Beach, CA (US); Jeremy Monroe, Ventura, CA (US)

(73) Assignee: MOJOOSE, INC., Laguna Niguel, CA (US)

( * ) Notice: Subject to any disclaimer, the term of this patent is extended or adjusted under 35 U.S.C. 154(b) by 0 days.

(21) Appl. No.: 14/216,985

(22) Filed: Mar. 17, 2014

(65) Prior Publication Data

US 2014/0199950 A1    Jul. 17, 2014

Related U.S. Application Data

(63) Continuation of application No. PCT/US2012/056708, filed on Sep. 21, 2012, which is a continuation of application No. 13/591,152, filed on Aug. 21, 2012, now Pat. No. 8,559,869, and a (Continued)

(51) Int. Cl.
*H04M 1/00* (2006.01)
*H04M 1/02* (2006.01)
*H01Q 1/24* (2006.01)
*H01Q 1/38* (2006.01)

(Continued)

(52) U.S. Cl.
CPC .................. *H04M 1/026* (2013.01); *G01S 7/02* (2013.01); *G01S 13/86* (2013.01); *H01Q 1/243* (2013.01); *H01Q 1/244* (2013.01); *H01Q 1/38* (2013.01); *H01Q 1/50* (2013.01); *H01Q 1/521* (2013.01); *H01Q 9/04* (2013.01); *H01Q 9/30* (2013.01); *H01Q 21/28* (2013.01); *H04B 1/0346* (2013.01); *H04B 1/3888* (2013.01)

(58) Field of Classification Search
CPC ....... H01Q 1/243; H01Q 1/38; H04B 1/3816; H04B 1/18
USPC .............. 455/575.1, 575.7, 556.1, 90.3, 571, 455/575.8; 343/702, 905, 906
See application file for complete search history.

(56) References Cited

U.S. PATENT DOCUMENTS 5,121,504 A    6/1992    Toko
5,170,494 A   12/1992    Levanto (Continued)

FOREIGN PATENT DOCUMENTS

CN    201233951    5/2009
GB      2378322    2/2003

(Continued)

OTHER PUBLICATIONS

WIPO, International Search Report, PCT/US2012/05670, Dec. 24, 2012.

(Continued)

*Primary Examiner* — Sonny Trinh
(74) *Attorney, Agent, or Firm* — Siritzky Law, PLLC

(57) ABSTRACT

A passively re-radiating cell phone sleeve assembly capable of receiving a nested cell phone provides signal boosting capabilities and provides a radar enablement. Signal boosting is enabled by use of an additional antenna, a pass-through repeater, dual antenna isolation capability and other features.

50 Claims, 14 Drawing Sheets

Related U.S. Application Data continuation of application No. 13/591,171, filed on Aug. 21, 2012, now Pat. No. 8,560,029, and a continuation of application No. 13/590,053, filed on Aug. 20, 2012, now Pat. No. 8,519,885, and a continuation of application No. 13/238,894, filed on Sep. 21, 2011, now Pat. No. 8,248,314, which is a continuation-in-part of application No. 13/591,152, filed on Aug. 21, 2012, now Pat. No. 8,559,869, and a continuation-in-part of application No. 13/590,053, filed on Aug. 20, 2012, now Pat. No. 8,519,885, which is a continuation-in-part of application No. 13/590,053, filed on Aug. 20, 2012, now Pat. No. 8,519,885, and a continuation-in-part of application No. 13/238,894, filed on Sep. 21, 2011, now Pat. No. 8,248,314, which is a continuation-in-part of application No. 13/238,894, filed on Sep. 21, 2011, now Pat. No. 8,248,314.

(60) Provisional application No. 61/385,386, filed on Sep. 22, 2010.

(51) Int. Cl.
*H01Q 9/04* (2006.01)
*H01Q 9/30* (2006.01)
*H01Q 21/28* (2006.01)
*H04B 1/034* (2006.01)
*H04B 1/3888* (2015.01)
*G01S 7/02* (2006.01)
*G01S 13/86* (2006.01)
*H01Q 1/50* (2006.01)
*H01Q 1/52* (2006.01)

(56) References Cited

U.S. PATENT DOCUMENTS

| | | | |
|---|---|---|---|
| 5,278,571 A | 1/1994 | Helfrick | |
| 5,338,896 A | 8/1994 | Danforth | |
| 5,532,703 A | 7/1996 | Stephens et al. | |
| 5,550,552 A | 8/1996 | Oxley | |
| 5,557,287 A | 9/1996 | Pottala et al. | |
| 5,673,053 A | 9/1997 | Marthinsson | |
| 5,711,014 A | 1/1998 | Crowley et al. | |
| 5,726,383 A | 3/1998 | Geller et al. | |
| 5,777,261 A | 7/1998 | Katz | |
| 5,777,585 A | 7/1998 | Tsuda et al. | |
| 5,787,340 A | 7/1998 | Sepponen | |
| 5,852,421 A | 12/1998 | Maldonado | |
| 5,854,970 A * | 12/1998 | Kivela | 455/575.7 |
| 5,907,794 A | 5/1999 | Lehmusto et al. | |
| 5,966,098 A | 10/1999 | Qi et al. | |
| 5,983,072 A | 11/1999 | Schroderus | |
| 5,995,064 A | 11/1999 | Yanagisawa et al. | |
| 6,031,495 A | 2/2000 | Simmons et al. | |
| 6,061,028 A | 5/2000 | Sakata | |
| 6,082,535 A | 7/2000 | Mitchell | |
| 6,111,545 A | 8/2000 | Saari | |
| 6,112,106 A | 8/2000 | Crowley et al. | |
| 6,132,306 A | 10/2000 | Trompower | |
| 6,249,256 B1 | 6/2001 | Luxon et al. | |
| 6,281,854 B1 | 8/2001 | Ohoka et al. | |
| 6,317,089 B1 | 11/2001 | Wilson et al. | |
| 6,341,217 B1 | 1/2002 | Wong | |
| 6,359,213 B1 | 3/2002 | Long | |
| 6,380,623 B1 | 4/2002 | Demore | |
| 6,459,915 B2 | 10/2002 | Nakamura et al. | |
| 6,492,952 B1 | 12/2002 | Hu | |
| 6,492,957 B2 | 12/2002 | Carillo, Jr. et al. | |
| 6,515,223 B2 | 2/2003 | Tashjian | |
| 6,538,607 B2 | 3/2003 | Barna | |
| 6,538,620 B2 | 3/2003 | Lin | |
| 6,568,576 B1 | 5/2003 | Godshaw et al. | |
| 6,576,832 B2 | 6/2003 | Svarfvar et al. | |
| 6,603,981 B1 | 8/2003 | Carillo, Jr. et al. | |
| 6,611,235 B2 * | 8/2003 | Barna et al. | 343/702 |
| 6,615,026 B1 | 9/2003 | Wong | |
| 6,624,789 B1 | 9/2003 | Kangasvieri et al. | |
| 6,697,603 B1 | 2/2004 | Lovinggood et al. | |
| 6,711,387 B1 | 3/2004 | Lungley | |
| 6,768,523 B2 | 7/2004 | Cheng et al. | |
| 6,855,883 B1 | 2/2005 | Matsui | |
| 6,856,819 B2 | 2/2005 | Itoh | |
| 6,871,079 B1 | 3/2005 | Choi et al. | |
| 6,880,737 B2 | 4/2005 | Bauer | |
| 6,924,769 B2 | 8/2005 | Ito et al. | |
| 6,924,770 B2 | 8/2005 | Carpenter et al. | |
| 6,947,000 B2 | 9/2005 | Ito | |
| 6,950,674 B2 | 9/2005 | Jarrett | |
| 6,980,777 B2 | 12/2005 | Shepherd et al. | |
| 6,985,110 B2 | 1/2006 | Tanaka et al. | |
| 7,031,762 B2 | 4/2006 | Shoji et al. | |
| 7,065,379 B1 | 6/2006 | Kim et al. | |
| 7,081,857 B2 | 7/2006 | Kinnunen et al. | |
| 7,084,819 B2 | 8/2006 | De La Torre Barreiro et al. | |
| 7,164,933 B1 | 1/2007 | Steigerwald et al. | |
| 7,202,825 B2 | 4/2007 | Leizerovich et al. | |
| 7,206,618 B2 | 4/2007 | Latto | |
| 7,207,902 B1 | 4/2007 | Hamlin | |
| 7,218,280 B2 | 5/2007 | Annamaa et al. | |
| 7,230,574 B2 | 6/2007 | Johnson | |
| 7,231,236 B2 | 6/2007 | Cho | |
| 7,295,160 B2 | 11/2007 | Purr et al. | |
| 7,327,841 B2 | 2/2008 | Schreiber et al. | |
| 7,405,698 B2 | 7/2008 | de Rochemont | |
| 7,405,702 B2 | 7/2008 | Annamaa | |
| 7,427,961 B2 | 9/2008 | Song et al. | |
| 7,616,158 B2 | 11/2009 | Mak et al. | |
| 7,719,083 B2 | 5/2010 | Chang | |
| 7,812,770 B2 | 10/2010 | Qi et al. | |
| 7,876,272 B2 | 1/2011 | Dou et al. | |
| 7,881,693 B2 | 2/2011 | Kurokawa | |
| 8,004,454 B2 | 8/2011 | Lindoff et al. | |
| 8,027,635 B2 | 9/2011 | Wee et al. | |
| 8,068,061 B2 | 11/2011 | Qi et al. | |
| 8,150,309 B2 | 4/2012 | Braithwaite | |
| 8,190,221 B2 * | 5/2012 | Jain et al. | 455/575.8 |
| 8,214,003 B2 | 7/2012 | Wong et al. | |
| 8,248,314 B2 | 8/2012 | Ash, Jr. et al. | |
| 8,275,412 B2 | 9/2012 | Alameh et al. | |
| 8,519,885 B2 | 8/2013 | Ash, Jr. et al. | |
| 8,559,869 B2 | 10/2013 | Ash, Jr. et al. | |
| 8,560,029 B2 | 10/2013 | Ash, Jr. et al. | |
| 8,750,948 B2 | 6/2014 | Wong et al. | |
| 2001/0051537 A1 | 12/2001 | Nakamura et al. | |
| 2002/0009976 A1 | 1/2002 | Rashidi | |
| 2002/0074142 A1 | 6/2002 | Katz | |
| 2002/0140745 A1 | 10/2002 | Ellenby et al. | |
| 2002/0154066 A1 | 10/2002 | Barna et al. | |
| 2002/0171602 A1 * | 11/2002 | Feibig et al. | 343/907 |
| 2002/0183013 A1 | 12/2002 | Auckland et al. | |
| 2002/0193136 A1 | 12/2002 | Halkosaari et al. | |
| 2003/0045246 A1 | 3/2003 | Lee et al. | |
| 2003/0078037 A1 | 4/2003 | Auckland et al. | |
| 2004/0014506 A1 | 1/2004 | Kemppinen | |
| 2005/0079820 A1 | 4/2005 | Yamashita | |
| 2005/0088345 A1 | 4/2005 | DeLa Torre Barreiro | |
| 2005/0104782 A1 | 5/2005 | Peled et al. | |
| 2005/0140474 A1 | 6/2005 | Kim | |
| 2005/0195119 A1 | 9/2005 | Gaucher et al. | |
| 2006/0019696 A1 | 1/2006 | Brunel et al. | |
| 2006/0022889 A1 | 2/2006 | Chiang et al. | |
| 2006/0052112 A1 | 3/2006 | Baussi et al. | |
| 2006/0232483 A1 | 10/2006 | Iwai et al. | |
| 2006/0290575 A1 | 12/2006 | Pelzer | |
| 2007/0004456 A1 | 1/2007 | Shimada | |
| 2007/0218951 A1 | 9/2007 | Risheq et al. | |
| 2007/0241977 A1 | 10/2007 | Vance | |
| 2008/0165064 A1 | 7/2008 | Hill et al. | |
| 2009/0124215 A1 | 5/2009 | Nysen | |
| 2009/0156151 A1 | 6/2009 | Anguera et al. | |
| 2009/0318094 A1 | 12/2009 | Pros et al. | |

(56) References Cited

U.S. PATENT DOCUMENTS

| | | |
|---|---|---|
| 2010/0066625 A1 | 3/2010 | Kazanchian |
| 2010/0075595 A1 | 3/2010 | DeMarco et al. |
| 2010/0113111 A1 | 5/2010 | Wong et al. |
| 2010/0214180 A1 | 8/2010 | Krogerus |
| 2010/0216520 A1 | 8/2010 | Lee |
| 2010/0234081 A1 | 9/2010 | Wong et al. |
| 2010/0264211 A1* | 10/2010 | Jain et al. ............... 235/380 |
| 2010/0291965 A1 | 11/2010 | Tabe |
| 2011/0012794 A1 | 1/2011 | Schlub |
| 2011/0036912 A1 | 2/2011 | Guo et al. |
| 2011/0109515 A1 | 5/2011 | Rao |
| 2011/0140982 A1 | 6/2011 | Ozden et al. |
| 2012/0044115 A1 | 2/2012 | McCaughey et al. |
| 2012/0056789 A1* | 3/2012 | Sohn ............................ 343/702 |
| 2012/0139805 A1 | 6/2012 | Yu et al. |
| 2012/0206302 A1 | 8/2012 | Ramachandran et al. |
| 2012/0206303 A1 | 8/2012 | Desclos et al. |
| 2013/0076573 A1 | 3/2013 | Rappoport et al. |
| 2013/0328730 A1 | 12/2013 | Guterman et al. |
| 2014/0062799 A1 | 3/2014 | Sutherland et al. |

FOREIGN PATENT DOCUMENTS

| | | |
|---|---|---|
| JP | 2006148751 | 6/2006 |
| WO | WO 2010/098540 | 2/2010 |

OTHER PUBLICATIONS

EPO Extended European Search Report for EP 12 83 3478.6, mailed Apr. 16, 2015 [5 pages, including Annex].

Office Action from Mexican Patent Office (IMPI) for MX/a/2014/003443, dated Feb. 4, 2015 [3 pgs.].

Office Action issued by Chinese Patent Office on May 11, 2015 in Chinese Application for Invention No. 201280056915.3 [7 pages with English translation, 10 pages].

* cited by examiner

US 9,124,679 B2

SLEEVE WITH ELECTRONIC EXTENSIONS FOR A CELL PHONE

CROSS-REFERENCE TO RELATED APPLICATIONS

This application is a continuation of International Application No. PCT/US2012/056708, filed Sep. 21, 2012, which claims the benefit of the following, the entire contents of each of which are hereby fully incorporated herein by reference for all purposes: (i) U.S. patent application Ser. No. 13/238,894, filed Sep. 21, 2011, titled "Inductively coupled signal booster for a wireless communication device and in combination therewith," now U.S. Pat. No. 8,248,314, issued Aug. 21, 2012, and which claims priority from provisional patent application No. 61/385,386, filed Sep. 22, 2010; and (ii) U.S. patent application Ser. No. 13/590,053, filed Aug. 20, 2012, titled "Combination hand-held phone and radar system," now U.S. Pat. No. 8,519,885, issued Aug. 27, 2013, which is a Continuation-In-Part (CIP) of U.S. application Ser. No. 13/238,894; and (iii) U.S. patent application Ser. No. 13/591,152, filed Aug. 21, 2012, titled "Smart channel selective repeater," now U.S. Pat. No. 8,559,869, issued Oct. 15, 2013, which is a CIP of application Ser. Nos. 13/238,894 and 13/590,053; and (iv) U.S. patent application Ser. No. 13/591,171, filed Aug. 21, 2012, titled "Isolation enhancement between planar antenna elements," now U.S. Pat. No. 8,560,029, issued Oct. 15, 2013, which is a CIP of application Ser. No. 13/238,894 filed on Sep. 21, 2011, and Ser. No. 13/590,053, filed on Aug. 21, 2012, and Ser. No. 13/591,152, filed on Aug. 21, 2012.

BACKGROUND

This disclosure relates to the field of wireless telecommunications and more particularly to a sleeve enclosure for extending the functional capability of a cell phone. Publication WO 2020/098540 discloses a double molding process wherein in a first molding step, an antenna is embedded within a resin jacket and in a second molding step the resin jacket is embedded within a device case by an insertion molding processes. Publication JP2006/148751 discloses the coupling of antennas built into a cover which when placed over the case of a portable terminal are positioned in close proximity to internal antennas of the terminal and are thereby able to be inductively coupled for strengthening transmitted signals.

SUMMARY

The present disclosure describes a sleeve capable of physically receiving and electronically communicating with a cell phone or other portable wireless communication device and also providing certain ancillary features and supports to the operation of the cell phone including: boosting the cell phone's signal reception and transmission including by use of an additional antenna, providing a radar feature whereby the cell phone is able to display a photo or video of a distant moving object while also calculating and displaying its velocity, providing a repeater capable of auto-tuning to a frequency of the cell phone and boosting signal strength, and employing dual planar antennas capable of operating in close proximity at two different frequencies with excellent isolation between the antennas, such antennas supporting the capabilities of the repeater. The sleeve increases the range of the cell phone and has integrated construction so that it is relatively inexpensive to manufacture and durable in use. The sleeve is able to combine the reception and transmission capacities of a nested cell phone's built-in antenna with an external antenna mounted on the sleeve, or a remote antenna, for greatly improved RF reception and transmission.

The details of one or more embodiments of these concepts are set forth in the accompanying drawings and the description below. Other features, objects, and advantages of these concepts will be apparent from the description and drawings, and from the claims.

DESCRIPTION OF DRAWINGS

Like reference symbols in the various drawing figures indicate like elements.

DETAILED DESCRIPTION

Figure 1A:
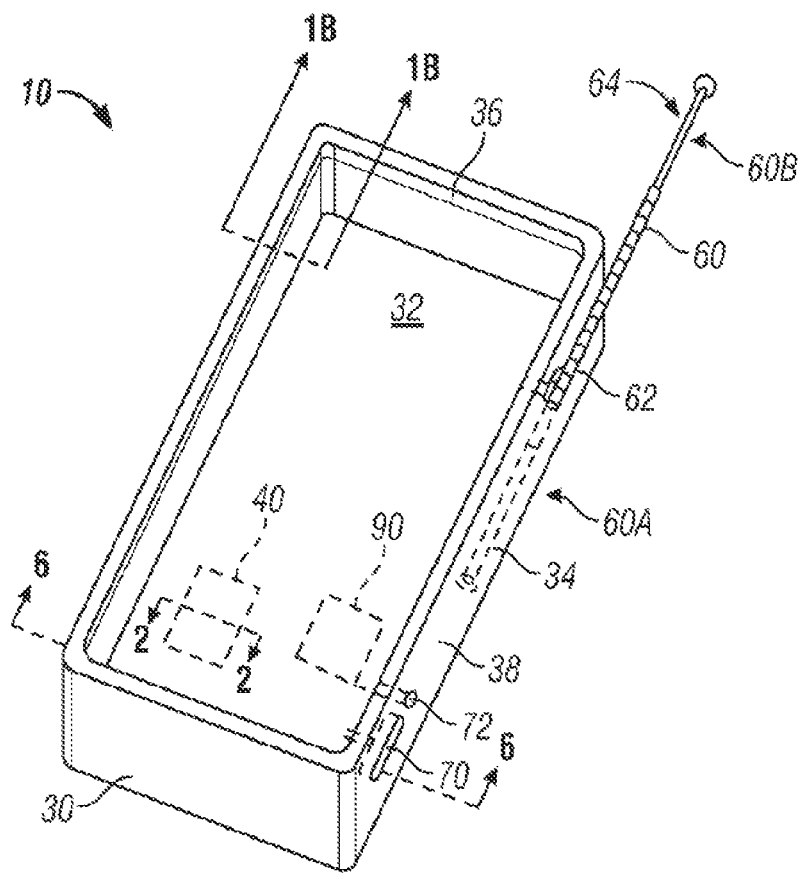
FIG. 1A is an example perspective view of the presently described sleeve.
Figure 1B:
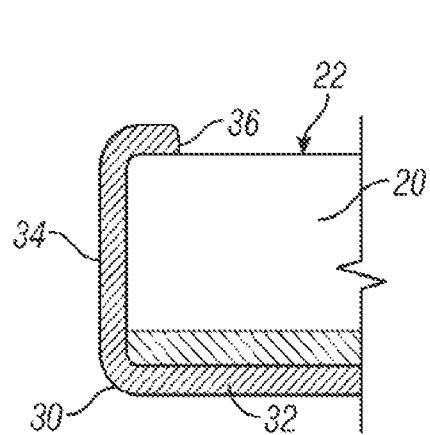
FIG. 1B is an example partial sectional side view of the sleeve taken from cutting plane 1B-1B and additionally showing a portion of a nested cell phone within the sleeve.

FIG. 1A illustrates a re-radiating cell phone sleeve assembly, referred to herein as "sleeve 10," capable of conforming to, and nesting with, a cell phone or similar portable wireless device which is not a part of sleeve 10. The term cell phone, referred to herein as "phone 20," is used throughout this description and it should be recognized that this term may refer to a cellular telephone or any other portable RF communication apparatus and sleeve 10 may be fabricated to dimensions that will accept each different size and shape phone 20. Sleeve 10 includes a full or partial enclosure 30 made of a conformable material such as rubber, rubberized plastic, a plastic and rubber combination, or a combination of plastic polymers. Enclosure 30 is capable of tightly fitting over and around at least a portion of phone 20. In the preferred embodiment shown in FIGS. 1A and 1B, enclosure 30 has a rear panel 32 integral with a surrounding side wall 34 which has an internal lip flange 36 all around. When phone 20 is nested within sleeve 10, a lip flange 36 (FIG. 1B) extends peripherally over a portion of a face 22 (FIG. 4) of phone 20 so as to secure phone 20 within sleeve 10. Also, the material of which enclosure 30 is fabricated may be at least partially elastic so that it may be stretched slightly upon receiving phone 20 and thereby providing an improved securement.

Referring again to FIG. 1A, a planar multi-layer radio frequency (RF) coupling probe 40 may be embedded within rear panel 32 by insertion injection molding or other means, and may be in a location that is in close proximity to, and may lay directly adjacent to an internal antenna 50 (FIG. 2) of phone 20 when phone 20 is within sleeve 10. In this manner, probe 40 is a position for electromagnetic coupling with internal antenna 50 for boosting the phone's signal strength. Inductive, capacitive or other electromagnetic coupling may be employed.

Figure 2:
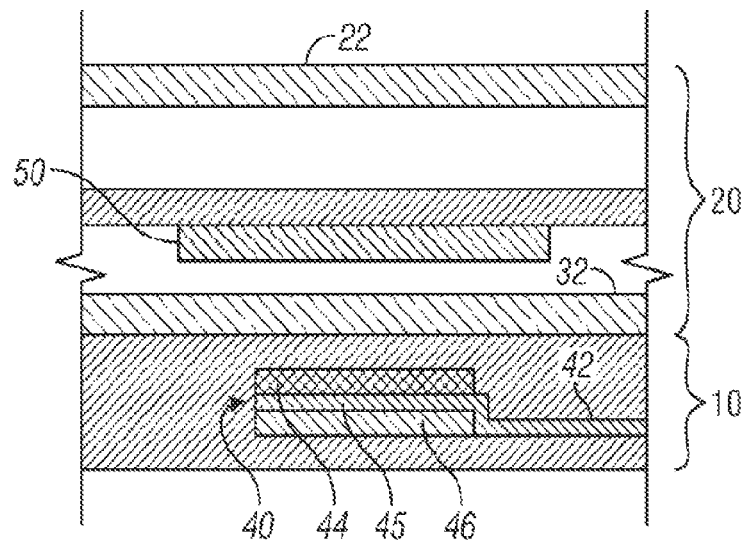
FIG. 2 is an example sectional view taken from cutting plane 2-2 in FIG. 1A showing a portion of a nested cell phone above a portion of the sleeve.

Referring still to FIG. 2, probe 40 may have a multilayer planar construction including a first material layer 44, such as, but not limited to fiberglass epoxy or thermoset laminate of low relative dielectric constant (DK) typically in the range of DK=2 to DK=5; a second patterned metallization layer 45 of copper, silver-filled paste or other electrical conductor which may be deposited or printed on one side of the first layer 44 and may have a material thickness of about 0.7 to 1.4 mils for optimal operation, thereby forming a distributed resonant circuit; and a third material layer 46 such as a ceramic-filled laminate having a relatively high DK typically in the range of DK=20 to DK=50, whereby layer 46 may be in intimate face-to-face contact with second layer 45. Probe 40 may have the same size and shape as internal antenna 50 for optimal operation. An important characteristic of probe 40 is that it functions as an anti-resonant network because of its high capacitance-to-inductance ratio which enables near field coupling and may be reception band selective by virtue of its unloaded high-Q quality factor. Band selectivity may provide multi-band resonance, for example, resonance for one or more frequency bands such as: 700, 850, 900, 1800, 1900, and 2100 MHz and others are possible, a highly desirable and novel characteristic.

Figure 1C:
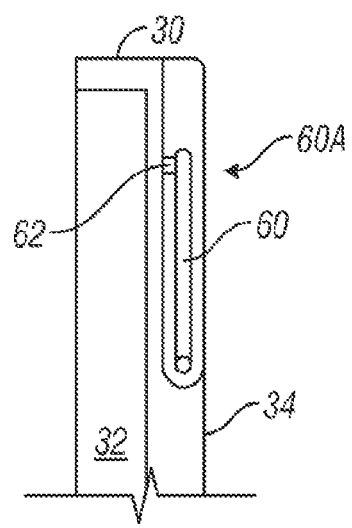
FIG. 1C is an example partial cutaway portion of the sleeve shown in FIG. 1A showing an additional enablement for storing an external antenna.
Figure 6A:
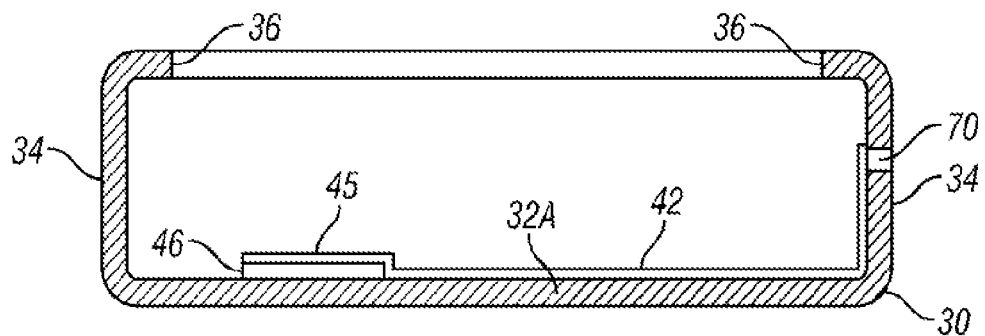
FIGS. 6A and 6B are example sectional views taken from cutting plane 6-6 in FIG. 1.
Figure 6B:
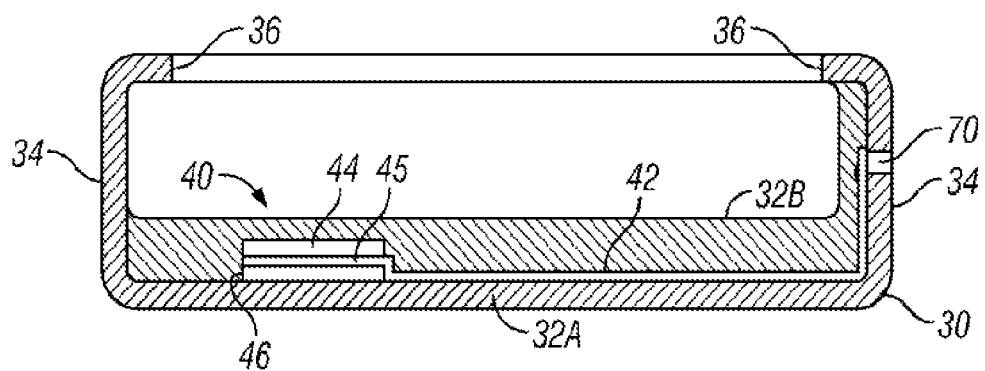

An external antenna 60, as shown physically in FIGS. 1A, 1C, and 6B may be mounted on, and in parallel alignment, with side wall 34. Transmission line 42, as shown in FIGS. 1A and 6B may be embedded within the rear panel 32 in order to connect probe 40 with external antenna 60 for RF signal transfer therebetween. Transmission line 42 may be a metallized or printed conductive strip. This arrangement enables RF transmission/reception at both the antennas 50 and 60 simultaneously while minimizing mutual interference. Antenna 60 may be mounted on enclosure 30 using a mechanical swivel joint 62 so that antenna 60 may be able to rotate between a retracted position 60A, shown in dashed line in FIG. 1A, and an extended position 60B shown with solid lines. Antenna 60 may be a simple rigid rod, telescoping or other. Side wall 34 may have a recess as shown in FIG. 1C for securing antenna 60 when retracted. Antenna 60 may be operational in both its retracted position 60A as well as its extended position 60B.

Figure 5:
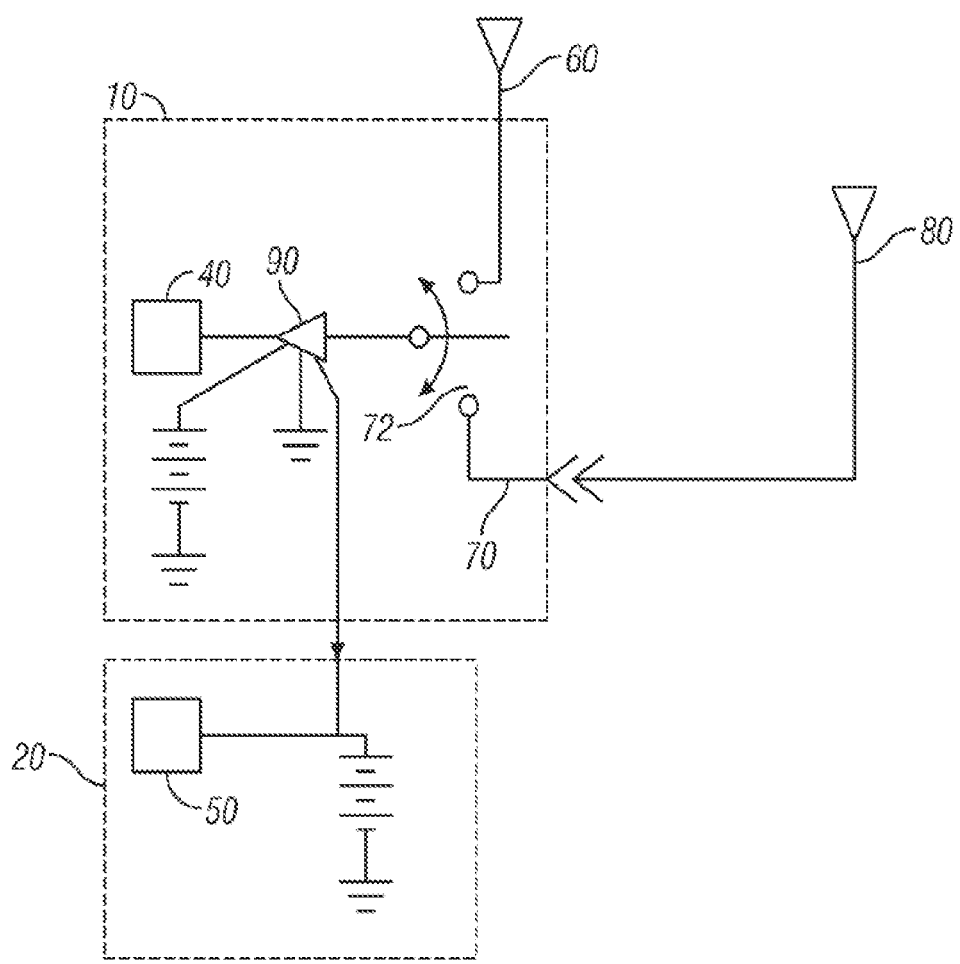
FIG. 5 is an example electrical schematic diagram of the sleeve and the cell phone showing an electrical interconnection.

As shown in FIGS. 1A and 5, sleeve 10 may have a remote antenna port 70, molded into side wall 34 along with a toggle switch 72. Switch 72 may function to select either external antenna 60 or a remote antenna 80 (FIG. 5). A signal boosting amplifier 90 may be in signal communication with probe 40, and switch 72 using metallized conductor paths 42 and 74. Amplifier 90 may be single or bi-directional and may be enabled with diplexers, duplexers and automatic gain control (AGC) and other features for improved performance. Amplifier 90, may be a planar device powered by battery 92 which may be mounted within side wall 34. Elements 40, 60, 70, 72, and 90 may be electrically interconnected using metallized or printed paths 42 and the paths 42 and elements 40, and 90 may be embedded within rear panel 32. This is shown in FIGS. 6A and 6B where enclosure 30 may be fabricated by injection molding techniques in a preferred approach where the rear panel 32 is constructed of layers 32A and 32B encapsulating probe 40, amplifier 90 and said conductive interconnecting paths 42 as shown in the schematic diagram of FIG. 5. As described above, sleeve 10 taken by itself defines one embodiment of the present apparatus. The sleeve 10, as nested and electronically interconnected with cell phone 20, defines a second embodiment.

Figure 3:
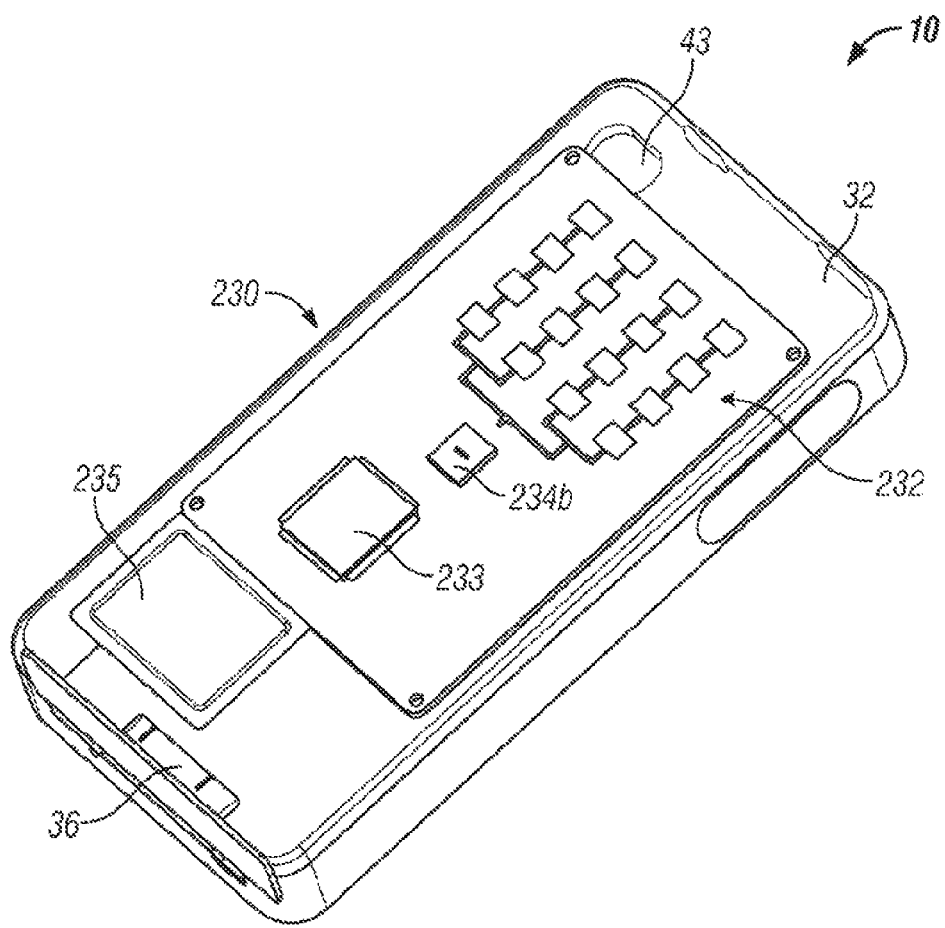
FIG. 3 is an example perspective view of the interior of a back panel of the sleeve showing details of a radar system's components therewithin.
Figure 4:
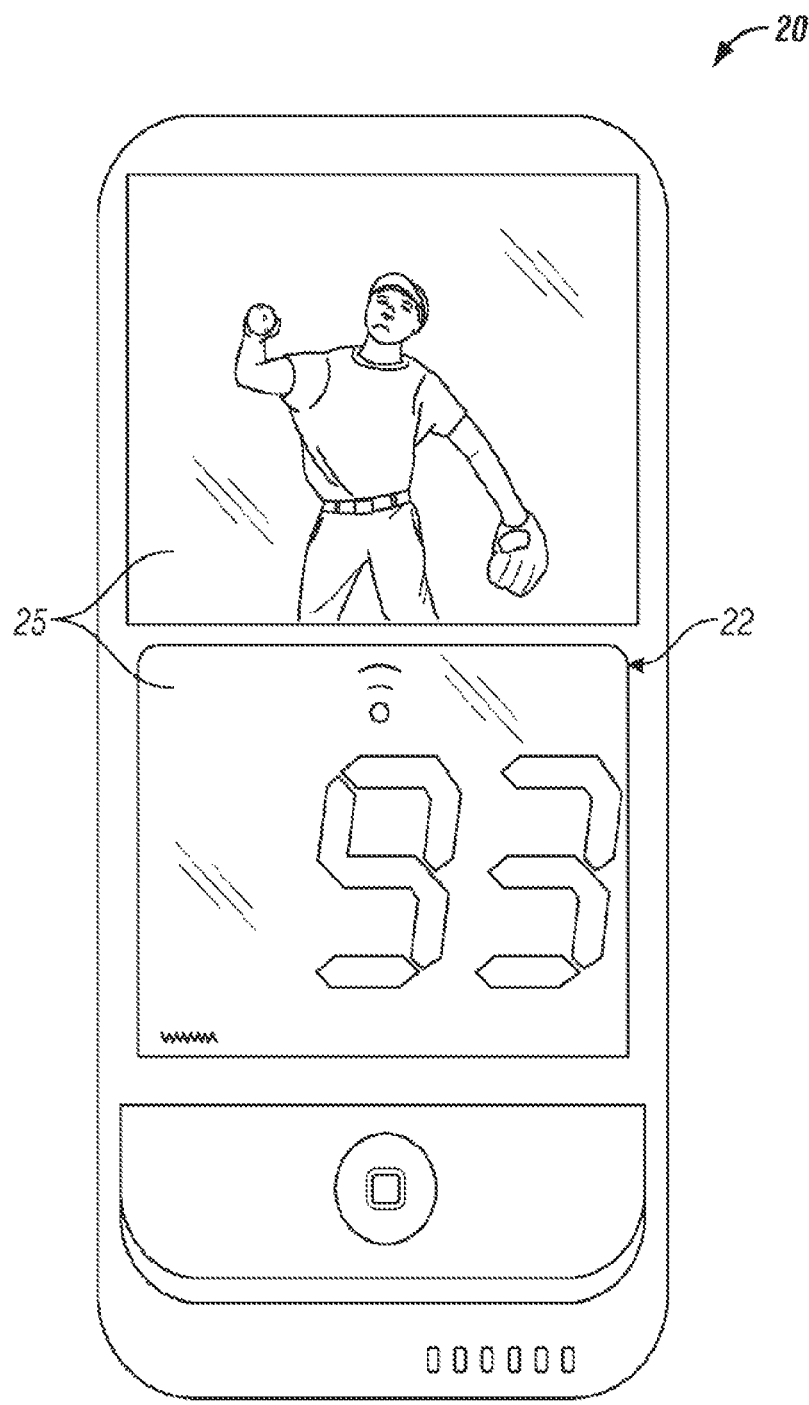
FIG. 4 is an example front face view of a cell phone showing a radar related display.
Figure 7:
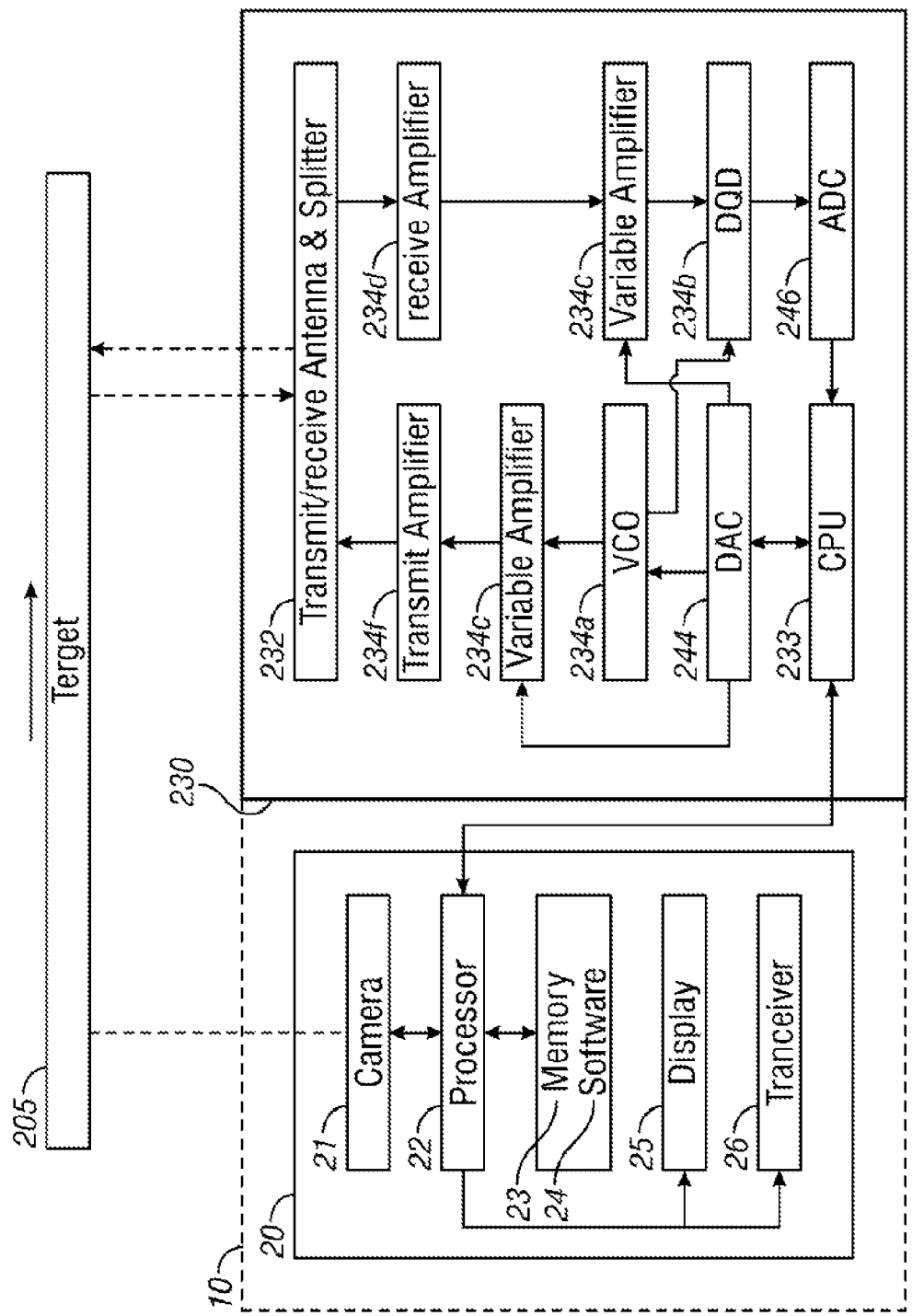
FIG. 7 is an example block diagram showing the sleeve and radar communicating with a target.
Figure 9:
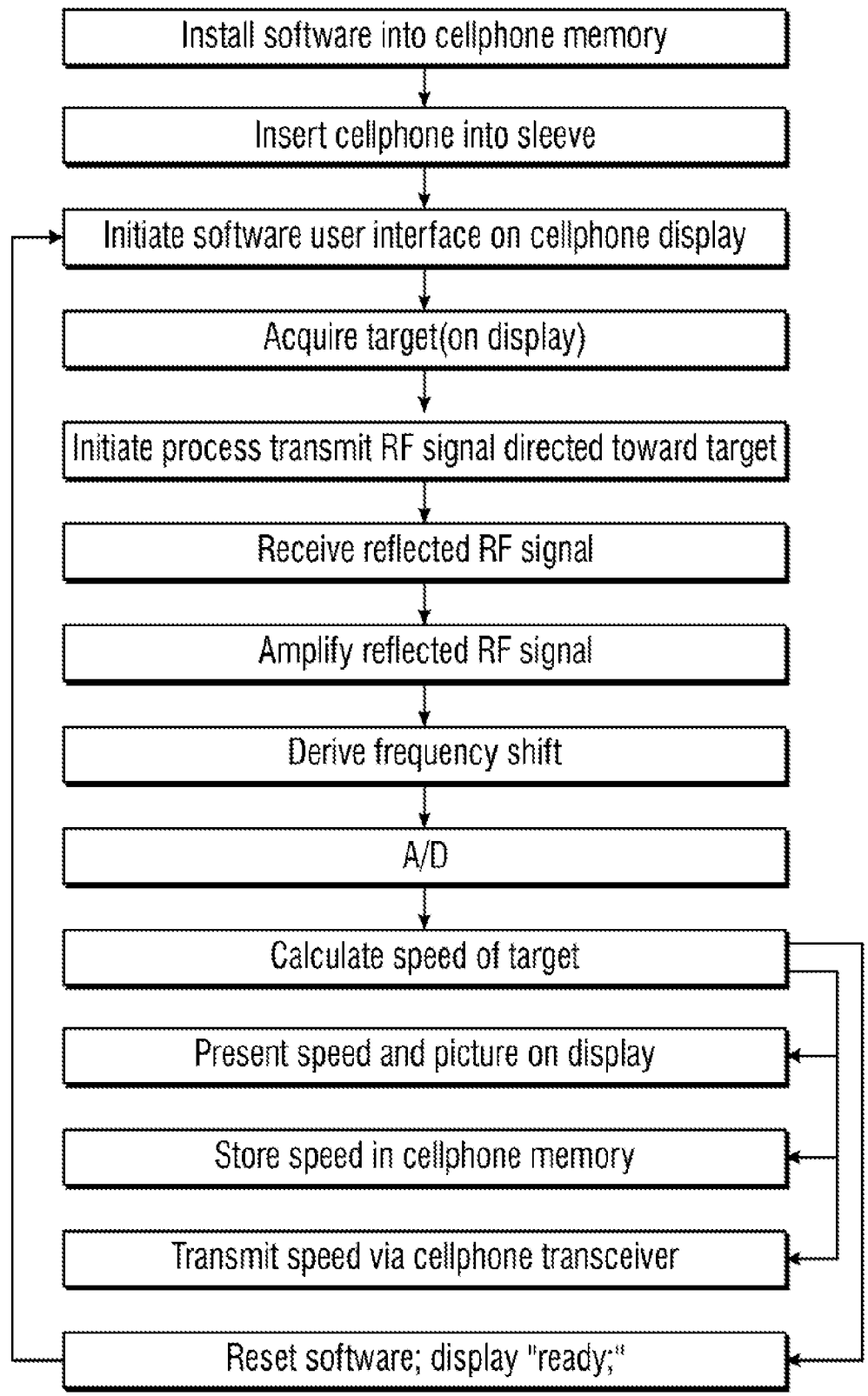
FIG. 9 is a logical flow diagram of an exemplary radar process.

As shown in FIG. 3 sleeve 10 may additionally be configured, with a radar system ("radar transceiver 230") physically integrated into rear panel 32. Radar transceiver 230 provides a means for measuring the speed of a distant object "target 205" as shown in FIG. 7, with the convenience of a cell phone 20. The radar transceiver 230 may be a Doppler radar system or another type of radar system. In this embodiment, the phone 10 has an optical targeting device such as a cellphone camera 21 which may be used to sight on target 205, while radar transceiver 230 measures its speed. A display such as a cellphone screen 25 may present the target 205 and its speed information as shown in FIG. 4. A storage medium such as a cellphone memory 23 is able to store this information while a wireless transmitter such as cellphone transceiver 26 transmits the information to one or more selected distant receivers such as other cell phones, land-line phones, automated computers, and other devices. The cellphone elements: 21, 23, 25, and 26 are operated by a cellphone processor 22 in accordance with cellphone electrical circuit and software protocols that are well known in the field of cell phone technology. Prior to using cell phone 20 for the present application, operational software 24 is loaded into cellphone memory 23, and then digital processor 22 carries out the instructions of software 24 in accordance with the present method as shown in FIG. 9 and described herein.

Use of the cell phone camera display 25 as a targeting device allows this hand-held system to be manually positioned for viewing target 205 so as to achieve an advantageous level of accuracy in determining the target's speed rather than that of extraneous nearby objects, and also in avoiding mixed or confused determinations due to moving backgrounds as the phone 20 tracks the path of target 25. As described, display 25 may be a solid-state display screen or it may be any other display device. Likewise, the wireless transmitter may be a phone transceiver 26 as stated, or it may be any other personal or mobile telephone or similar device. One or more of the: display 25, memory 23, software 24, processor 22, and wireless transceiver 26 may be integrated into sleeve 10, or may be a separate component but may be interconnected as shown in FIG. 7.

Figure 8:
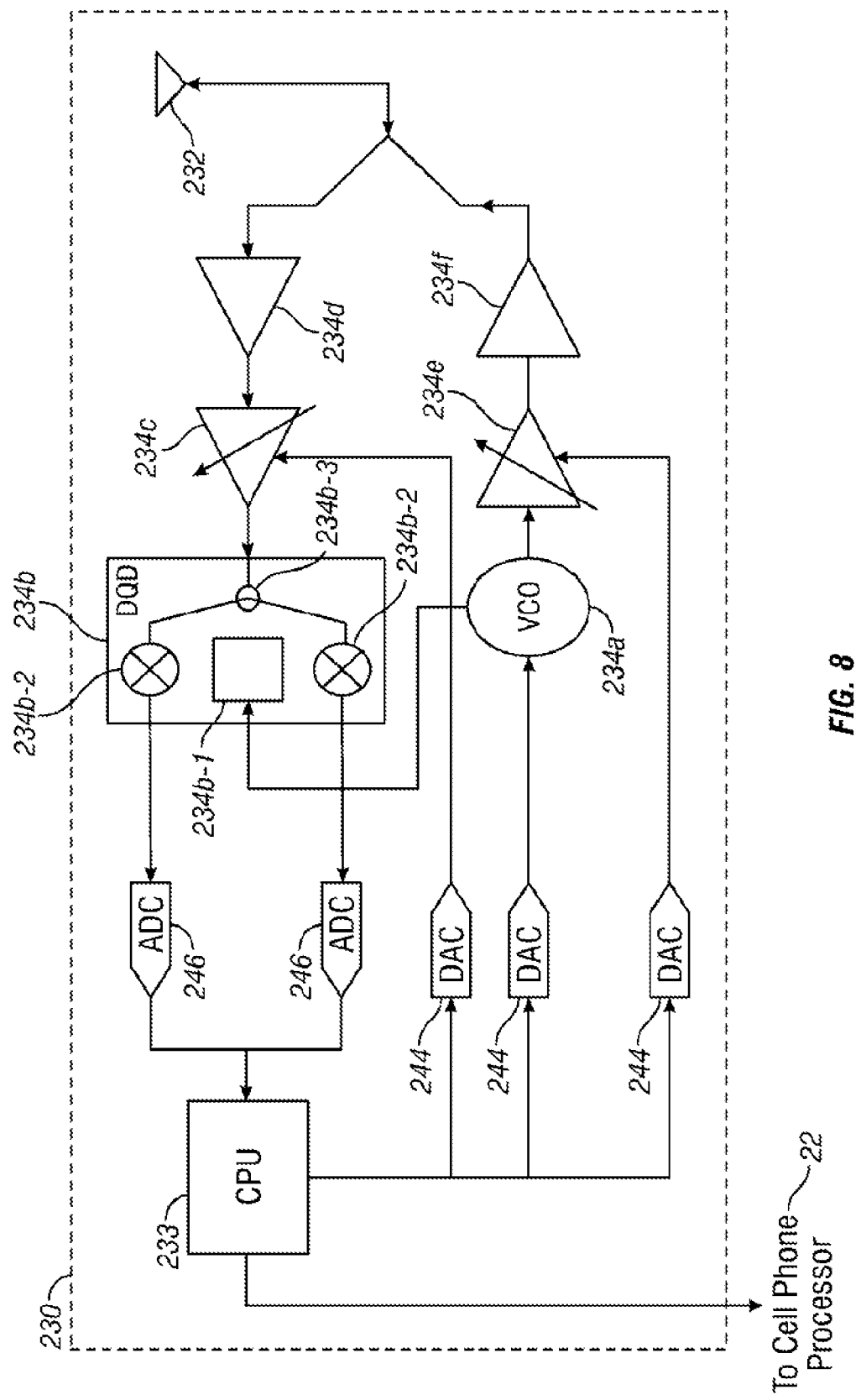
FIG. 8 is an example schematic diagram of the radar.

As shown in FIGS. 7 and 8, radar transceiver 230 includes transmit-receive antenna 232, transmit amplifier 234$f$, receive amplifier 234$d$, variable amplifiers 234$c$, voltage controlled oscillator 234$a$ (VCO), transceiver processor/controller 233 (CPU), quadrature demodulator 234$b$ (DQD), analog-to-digital converter 246 (ADC), and digital-to-analog converter 244 (DAC).

When phone 20 is placed within sleeve 10 the link between phone 20 and radar transceiver 230 is made by, for instance connector 36 (FIG. 3), or by a wireless method such as Bluetooth, or by induced signals between adjacent non-conducting elements as fully explained above. Radar transceiver 230 may use a highly directional transmit antenna to better focus radiated RF energy in the direction of target 205. Various antenna designs may be used including a planar array of patch antenna elements, as shown in FIG. 3, which provide the necessary gain and directivity. The transmit-receive antenna 232 may alternately be separate antennas for receive and transmit.

Radar transceiver 230 utilizes the Doppler effect, as previously described, comparing a transmitted wave frequency with a bounced wave frequency to determine the shift in frequency due to the relative motion between the target 205 and the transmit/receive antenna 232.

Once phone 20 is installed in sleeve 10 and software 24 is installed in memory 23 the apparatus is ready to measure the speed of a distant moving object. With the back panel 32 directed toward a moving target 205 an "app" icon is selected on display 25 which sends a start signal to radar transceiver processor 233 to initiate instructions for carrying-out a speed measurement cycle. The electrical circuit diagram of FIG. 18 supports an understanding of this process. A radar burst (RF energy) is emitted by transmit amplifier 234*f* through antenna 232 in the direction of target 205. This RF energy impinges on target 205 and a small amount of the RF energy signal is reflected and acquired by antenna 232. Low noise receive amplifier 234*d* boosts the acquired reflected signal and quadrature demodulator 234*b* down-converts the signal. Demodulator 234*b* comprises high-frequency splitter 234*b*-3 which delivers the reflected signal to mixers 234*b*-2. Low frequency splitter 234*b*-1 delivers the transmitted signal to mixers 234*b*-2. The output from mixers 234*b*-2 is the difference between the transmitted and reflected frequencies. This difference signal is the Doppler frequency shift due to the relative velocities of sleeve 10 and target 205. The difference signal is digitally sampled and the speed of the target is calculated by CPU 233 using the well-known formula v=Fd/2(Ft/c) and the speed information is routed to phone processor 22. The calculated speed of the target is displayed as shown in FIG. 4. Alternately, the digital samples may be routed directly to phone processor 22 for speed calculation and display. FIG. 9 is an overview of the process.

Radar transceiver processor 233, driven by battery 235, communicates with the cellphone processor 22 and also sets amplifier gain, VCO frequency, and other settings as directed by software 24. The process is identical whether or not the phone 20 and the radar transceiver 230 are integral or separate units. When software 24 is initialized it produces a user interface on cellphone display 25 and also initiates a background process communicating with radar transceiver 230. To acquire a speed measurement, as said, phone 20 is directed toward target 205 so that it is visible on display 25. The software 24 enables the capture of video images using the cellphone's camera which is able to view target 205 through opening 43 in the back panel 32 of sleeve 10. As said, speed measurements may be displayed and also recorded into memory 23 in along with video capture.

Figure 10:
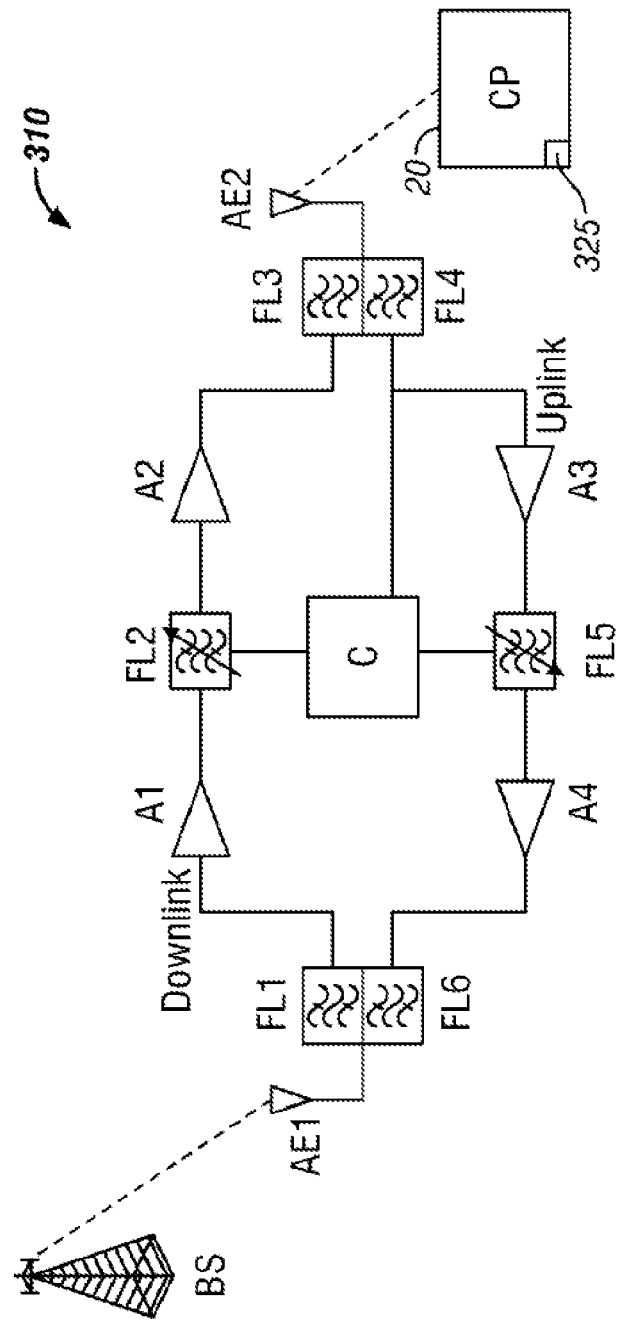
FIGS. 10, 11, and 12 are exemplary electrical schematic diagrams of a signal repeater circuit.
Figure 11:
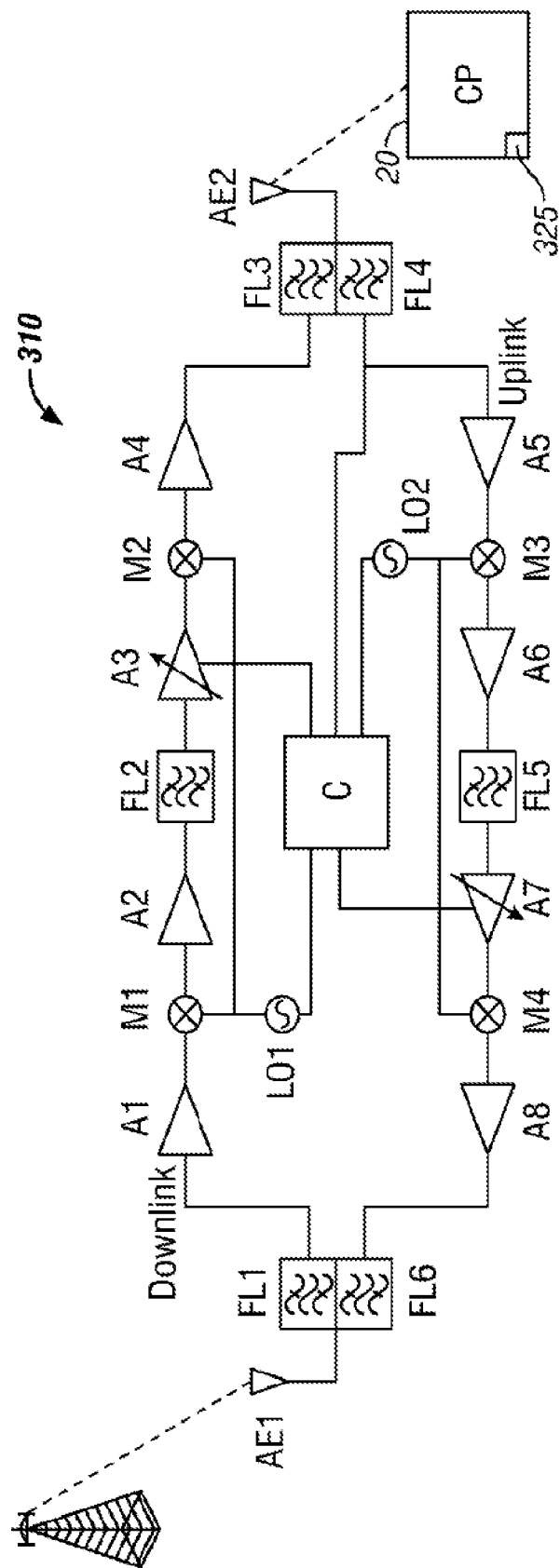
Figure 12:
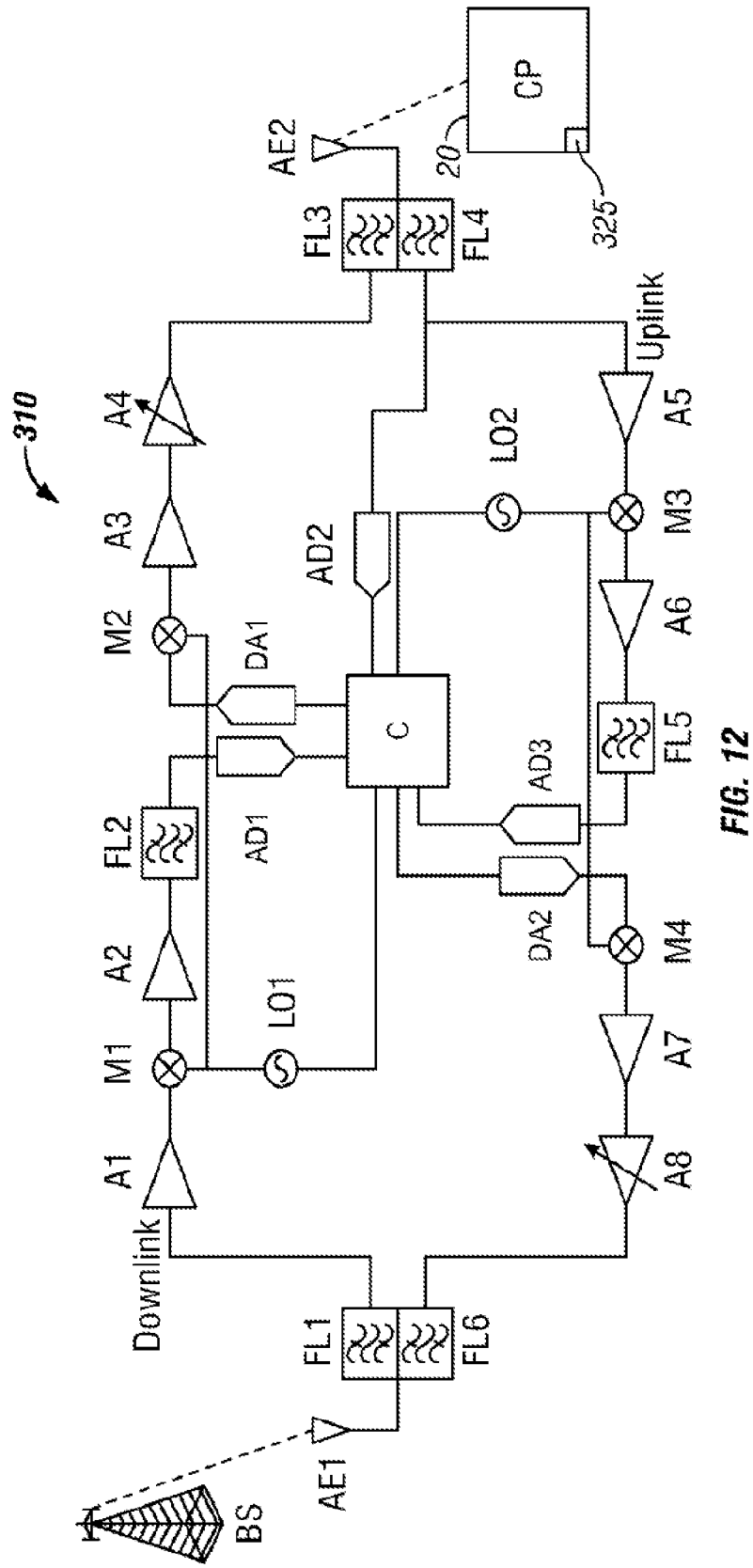

Sleeve 10 may further include a frequency selective repeater circuit 310 which uses frequency information received from enclosed phone 20 to adjust signal filtering in order to boost signal strength at a selected frequency. As shown in FIGS. 10, 11, and 12, phone 20 may communicate with a base station BS as is well known. Also well known in cellular telephony, is that cell phones 20 adapt their operating frequency as dictated by the base stations BS through which they operate. This operating frequency is stored in cell phone memory. The operating frequency is transmitted by the cell phone 20 continuously in accordance with a software application 325 stored in cell phone memory and executed by the cell phone's processor 22. Repeater 310 receives the cell phone's signal and adjusts to the operating frequency.

FIGS. 10, 11, and 12 disclose embodiments of a repeater 310. FIG. 10 shows a circuit downlink path including antenna AE1, filter FL1, amplifier stage A1, variable filter FL2, amplifier stage A2, filter FL3 and antenna AE2. An uplink path includes antenna AE2, filter FL4, amplifier stage A3, variable filter FL5, amplifier stage A4, filter FL6 and antenna AE1. A controller C, such as model SAM9 manufactured by Atmel, Inc., receives an operating frequency designation and adjusts FL2 and FL5 each of which may be a model Micro-400-700 manufactured by Pole Zero, Inc. to pass only a band centered on the operating frequency. This circuit enables information relayed from base station BS to cell phone 20 to be used to adjust the band pass within the circuit so as to exclude other frequencies and noise and only repeat and boost a selected RF frequency or pass band of frequencies. In this embodiment all analog components function at RF frequencies. This has the advantage of being relatively less expensive, however, it does not achieve the out-of-band frequency and noise rejection that a circuit operating at an intermediate frequency (IF) can achieve.

FIG. 11 discloses a further embodiment of repeater 310 having a downlink path including antenna AE1, RF filter FL1, amplifier stage A1, mixer M1, local oscillator LO1, amplifier stage A2, IF filter FL2, IF variable gain amplifier stage A3, mixer M2, RF amplifier stage A4, RF filter FL3 and antenna AE2. An uplink path includes antenna AE2, RF filter FL4, RF amplifier stage A5, mixer M3, local oscillator LO2, IF amplifier stage A6, IF filter FL5, variable IF amplifier stage A7, mixer M4, RF amplifier stage A8, RF filter FL6, and antenna AE1. As with the circuit of FIG. 10, controller C receives operating frequency information from cell phone 20 and adjusts their band pass by adjusting the local oscillators LO1 and LO2. As above, this circuit enables information relayed from base station BS to cell phone 20 to adjust the band pass within the circuit so as to exclude other frequencies and noise and only repeat and boost a selected RF frequency or pass band of frequencies. In this embodiment the drawback of circuit FIG. 10 is avoided since filtering and amplification functions are able to be conducted in the IF frequency range. FIG. 12 operates in the same manner as the circuit of FIG. 11 with the improvement of digital processing at controller C which results in an improved control over oscillators LO1 and LO2.

Figure 13:
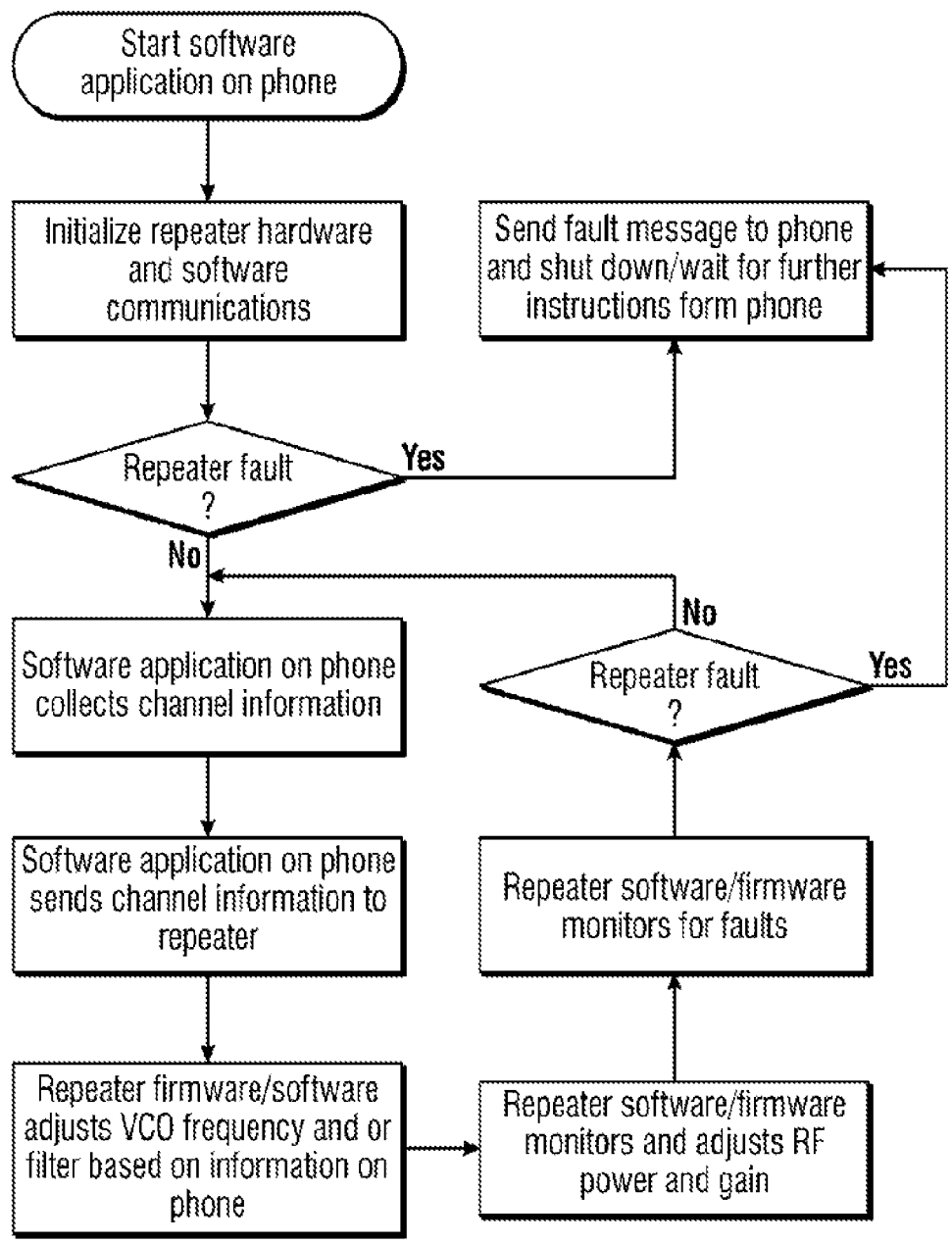
FIG. 13 is a logical flow diagram of an exemplary process of the repeater circuits of FIGS. 10, 11, and 12.

In the circuits shown in FIGS. 11 and 12 filtering and amplification is conducted in the IF range. As is known, it is difficult to build amplifiers, filters, and detectors that can be tuned to different frequencies, but it is easy to build tunable oscillators. Also, in RF communications, converting to a lower intermediate frequency offers an advantage because RF amplifiers have upper frequency gain limits so that a lower IF offers the possibility of higher gain. Also, at IF, filtering to extract a single frequency from signals that are close together is easier and noise is also easier to exclude. This is because a filter's bandwidth increases proportionately with the signal's frequency. So a narrower bandwidth and more selectivity can be achieved by converting the signal to an IF. The IF used may be 10.7 MHz or a frequency in that range. FIG. 13 defines a method of operation of these circuits. In this method, repeater hardware and software are initialized for communications. Repeater fault detection may find positive and if so, repeater 310 is shut down awaiting instructions. If no fault is detected, phone software collects channel information from a base station BS and this information is transmitted to repeater 310. Next, repeater 310 adjusts VCO frequency or signal filters in accordance with the channel information and adjusts RF power and gain. Repeater 310 is now able to monitor for fault detection and if detected, repeater 310 sends fault information to phone 20 and shuts down awaiting further instructions. If no fault is detected channel information is collected and this cycle is repeated continuously.

Figure 14:
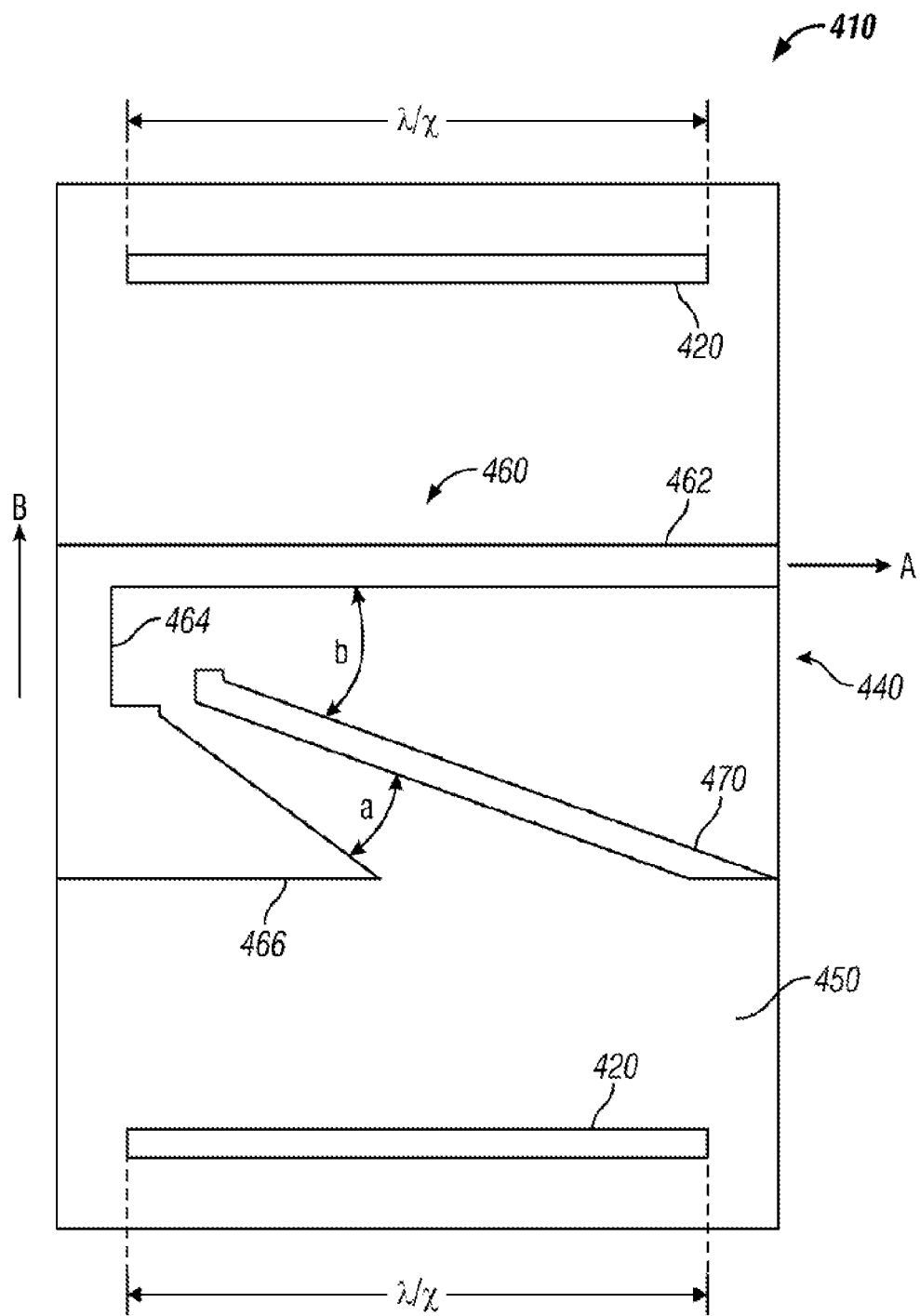
FIG. 14 is an example plan view of a dual antenna system with slot isolation.
Figure 15:
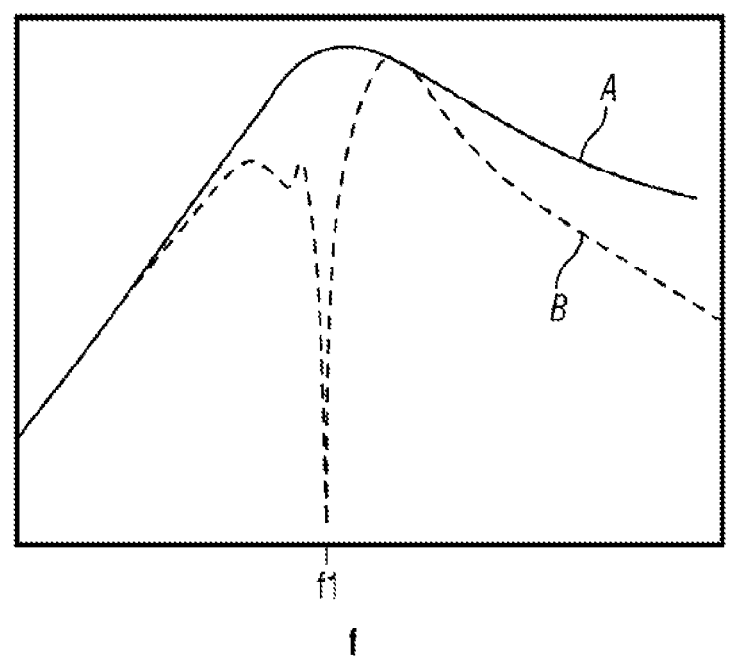
FIG. 15 is an example graphical plot showing isolation between antenna elements.

The antenna system 410 shown in FIG. 14 may represent antennas AE1 and AE2 of repeater 310 and has broad applicability beyond such repeaters. For optimal operation elements 420 and 430 may have a length of lambda/4, 2, or 1. Elements 420 and 430 are part of the antenna structure shown and has a tuned slot element 440 positioned between the antenna elements 420, 430, the tuned slot element 440 enabling preferential signal reception by the antenna elements 420, 430 in two selected frequency bands with the advantage of providing isolation of the radiation of each of the antenna elements 420, 430 from each other. The antenna elements 420, 430 and the tuned slot element 440 may be planar and may be electrically conductive, and mounted on a dielectric sheet 450. Elements 420, 430, 440 may be covered by a dielectric layer (not shown). The antenna and tuned slot elements 420, 430, 440 may be of copper sheet material and the dielectric sheet 450 may be of a glass epoxy substrate material or similar substance. As shown in FIG. 14, the tuned slot element 440 may have two spaced apart segments, a C-shaped segment 460 and a roughly linear segment 470. The C-shaped segment 460 may have a first linear leg 462 extending in a first direction (arrow A), and a second linear leg 464 extending in a second direction (arrow B), and the second direction may be orthogonal with respect to the first direction. The C-shaped segment 460 may also have a triangular portion 466. The linear segment 470 may form an acute angle (a) with the triangular portion 466 and also form a second acute angle (b) with the first linear leg 462. Spacing between the linear segment 470 and the triangular portion 466 may enable 1900 MHz signal reception by the antenna elements 420, 430 while spacing between the linear segment 470 and the first linear leg 462 may enable 850 MHz signal reception by the antenna elements. FIG. 15 is a plot of antenna signal isolation (i) with respect to radio frequency (f). Curve A (solid line) is as measured with the tuned slot element 440 missing or removed, while curve B (broken line) is as measured with tuned slot element 440 as shown in FIG. 14. It is clear that tuned slot element 440 provides almost infinite isolation at the operating frequency F1.

The common functions of signal reception and transmission, filtering, amplification, mixing using a local oscillator, and converting between analog and digital signal forms are well known in the field so that further details of these functions and the nature of these operations is not further described herein. The "Electrical Engineering Reference Manual," ISBN: 9781591261117 is incorporated herein by reference in its entirety to provide details and technical support related to the elements and functions presented herein. Embodiments of the subject apparatus and method have been described herein. Nevertheless, it will be understood that various modifications may be made without departing from the spirit and understanding of this disclosure. Accordingly, other embodiments and approaches are within the scope of the following claims.

Applications U.S. Ser. No. 13/238,894 filed on 21 Sep. 2011, U.S. Ser. No. 13/590,053 filed on 20 Aug. 2012, U.S. Ser. No. 13/591,152 filed on 21 Aug. 2012, and U.S. Ser. No. 13/591,171 filed on 21 Aug. 2012 are hereby incorporated into this document by reference in their entirety.

What is claimed is:

1. An assembly comprising:
 a radio frequency coupling device positioned in an enclosure of said assembly for electromagnetic coupling with an antenna of an electronic communication device when said communication device is in said enclosure of the assembly; and
 an antenna circuit joined with the coupling device and positioned for electromagnetic coupling therewith by a transmission line,
 the coupling device including at least a metallization layer.

2. The assembly of claim 1 further comprising a dual antenna isolation circuit.

3. The assembly of claim 1 wherein said electronic communication device is tunable to a cellular channel, the assembly further comprising:
 a channel selective repeater tunable to the cellular channel via a command received from the electronic communication device; and
 the channel selective repeater adapted for signal exchange with the electronic communication device and a base station within the cellular channel.

4. The assembly of claim 1 wherein said enclosure encases at least a portion of said communication device.

5. The assembly of claim 1 wherein said coupling device is embedded in a rear panel of said enclosure.

6. The assembly of claim 1 wherein said coupling device is positioned in said enclosure to lay substantially adjacent to said antenna of said communication device when said communication device is in said enclosure.

7. The assembly of claim 1 wherein the coupling device has a multi-frequency band resonance.

8. The assembly of claim 7 wherein the coupling device has a multi-frequency band resonance enabling plural frequency band selectivity including at least one of 700, 850, 900, 1800, 1900, and 2100 MHz.

9. The assembly of claim 1 wherein said electromagnetic coupling comprises near field coupling.

10. The assembly of claim 1 wherein said coupling device has a multilayer planar construction.

11. The assembly of claim 10 wherein the coupling device has a high capacitance-to-inductance ratio.

12. The assembly of claim 1 wherein said enclosure comprises an enclosure antenna electronically connected to said coupling device.

13. The assembly of claim 12 wherein said enclosure antenna comprises an external antenna.

14. The assembly of claim 13 wherein said external antenna is positioned on a side portion of said enclosure.

15. The assembly of claim 12 wherein said external antenna is recessed in said enclosure.

16. The assembly of claim 1 further comprising a battery.

17. The assembly of claim 1 wherein said assembly comprises a sleeve assembly for engaging said communication device in a nested relationship.

18. The assembly of claim 1 wherein the transmission line is a metallized path embedded within the enclosure.

19. The assembly of claim 1 wherein said enclosure comprises an enclosure antenna, and wherein said antenna circuit is a signal amplifying antenna circuit electronically connected to said enclosure antenna and to said coupling device.

20. A case for improving radio frequency (RF) signal quality for an electronic communication device, the case comprising:
 an assembly that encases at least a portion of the electronic communication device;
 an assembly antenna;
 a transmission line attached to the assembly and electrically interconnected to the assembly antenna; and
 a near-field coupling device attached to the assembly and electrically interconnected to the transmission line, the near-field coupling device configured to near-field couple to a native antenna of the encased electronic communication device to capture an electromagnetic signal generated by the native antenna of the electronic communication device, the near-field coupling device further configured to conduct the captured electromagnetic signal from the near-field coupling device to the assembly antenna through the transmission line.

21. The case of claim 20 wherein said assembly antenna comprises an external antenna.

22. The case of claim 21, wherein the assembly antenna is positionable relative to the assembly, the assembly antenna having at least a stowed position and an assembly position.

23. The case of claim 20 wherein said coupling device has a multilayer construction.

24. The case of claim 23 wherein the coupling device comprises at least a metallization layer.

25. The case of claim 20, wherein the captured electromagnetic signal is passively conducted from the near-field coupling device to the assembly antenna through the transmission line.

26. The case of claim 20, wherein conducting the captured electromagnetic signal to the assembly antenna through the transmission line does not include actively amplifying the captured signal.

27. The case of claim 20, wherein the case is a protective case for the electronic communication device.

28. The case of claim 20 further comprising a battery.

29. The case of claim 28 further wherein the battery is incorporated in the assembly.

30. The case of claim 20 further comprising:
an amplifier interconnected with the transmission line and the assembly antenna, said amplifier amplifying signals between the assembly antenna and the coupling device.

31. The case of claim 20, wherein conducting electromagnetic signals from the assembly antenna to the conducting device includes actively amplifying the signals.

32. A sleeve assembly for engaging a cell phone in a nested relationship, the assembly comprising:
an enclosure for fitting over and around at least a portion of the cell phone;
a radio frequency (RF) coupling probe embedded in the enclosure;
an assembly antenna electronically connected to the coupling probe by at least one transmission line, wherein
said RF coupling probe is positioned for electromagnetic coupling with an antenna of the cell phone when the cell phone is in said sleeve assembly.

33. The assembly of claim 32 wherein the enclosure is of a conformable material.

34. The assembly of claim 33 wherein the conformable material is one of rubber, rubberized plastic, a plastic and rubber combination, and a combination of plastic polymers wherein the material has an elasticity characteristic.

35. The assembly of claim 32 wherein the coupling probe has a multilayer planar construction.

36. The assembly of claim 32 further comprising a signal amplifier and interconnected with the transmission line for amplifying signals between the assembly antenna and the RF coupling probe.

37. The assembly of claim 36 wherein the enclosure has a bottom panel, and wherein the signal amplifier is embedded within the bottom panel.

38. The assembly of claim 32 wherein the enclosure has a bottom panel, and wherein the RF coupling probe is embedded within the bottom panel.

39. The assembly of claim 32 wherein the enclosure holds the cell phone such that the RF coupling probe is substantially adjacent to the antenna of the cell phone when the cell phone is in the sleeve assembly.

40. The assembly of claim 32 wherein the RF coupling probe has a multi-frequency band resonance.

41. The assembly of claim 40 wherein the RF coupling probe has a multi-frequency band resonance enabling plural frequency band selectivity including at least one of 700, 850, 900, 1800, 1900, and 2100 MHz.

42. An assembly comprising:
an assembly antenna; and
a radio frequency (RF) coupling device electronically connected with the assembly antenna and positioned in an enclosure of said assembly for electromagnetic coupling with an antenna of an electronic communication device when said communication device is in said enclosure of the assembly, wherein said coupling device is positioned in said enclosure to lay substantially adjacent to said antenna of said communication device when said communication device is in said enclosure.

43. The assembly of claim 42 wherein said coupling device has a multilayer planar construction.

44. The assembly of claim 42 further comprising a battery.

45. An assembly comprising:
an assembly antenna;
a radio frequency (RF) coupling device having a multilayer planar construction and electronically connected with the assembly antenna and positioned in an enclosure of said assembly for electromagnetic coupling with an antenna of an electronic communication device when said communication device is in said enclosure of the assembly, wherein said coupling device is positioned in said enclosure to lay substantially adjacent to said antenna of said communication device when said communication device is in said enclosure; and
a signal amplifier interconnected with the RF coupling device for amplifying signals from the assembly antenna and the RF coupling probe,
wherein the RF coupling probe has a multi-frequency band resonance enabling plural frequency band selectivity.

46. An assembly comprising:
(A) a radio frequency coupling device positioned in an enclosure of said assembly for electromagnetic coupling with an antenna of an electronic communication device when said communication device is in said enclosure of the assembly; and
(B) an antenna circuit joined with the coupling device and positioned for electromagnetic coupling therewith by a transmission line,
wherein said electronic communication device is tunable to a cellular channel, the assembly further comprising:
(C) a channel selective repeater tunable to the cellular channel via a command received from the electronic communication device, wherein
the channel selective repeater is adapted for signal exchange with the electronic communication device and a base station within the cellular channel.

47. The assembly of claim 46 further comprising an antenna circuit joined with the coupling device and positioned for electromagnetic coupling therewith by a transmission line.

48. The assembly of claim 47 wherein the transmission line is a metallized path embedded within the enclosure.

49. The assembly of claim 47 wherein said enclosure comprises an enclosure antenna, and wherein said antenna circuit is a signal amplifying antenna circuit electronically connected to said enclosure antenna and to said coupling device.

50. The assembly of claim 46 wherein said assembly comprises a sleeve assembly for engaging said communication device in a nested relationship.

* * * * *